United States Patent Office 2,912,339
Patented Nov. 10, 1959

2,912,339

GLASS COMPOSITION

Earl E. Middleswarth, Arnold, and James E. Duncan, Brackenridge, Pa., assignors to Pittsburgh Plate Glass Company No Drawing. Application January 13, 1954
Serial No. 403,908

12 Claims. (Cl. 106—53)

The present invention relates to a family of glass compositions suitable to provide a series of opaque glasses having a steel gray color. Glasses of this type are manufactured by either the pot casting method or in continuous furnaces and are sold under the trade name of Gun Metal Carrara. They are used for interior decorative purposes, such as bathroom and kitchen walls, and for exterior walls, such as store and service station fronts.

We have found previously that a pleasing opaque grayish color can be imparted to glasses used for structural decorative purposes by adding fluorides to opacify the glass and a mixture of minor proportions of nickel, chromium and cobalt oxides to provide the desired color.

However, the presence of chromium in the glass batch is looked upon with disfavor by glass fabricating personnel, because chromic oxide has a high melting point and is not very soluble in molten glass and also because the chromium varies in color between a yellowish-green and a bluish-green depending upon the oxidizing conditions present.

An object of the present invention is to provide opaque glasses substantially free of chromium, having a permanent, uniform gray color, good mechanical strength, resistance to weathering and staining, freedom from bubbles and other imperfections, and fabricable in relatively large quantities by such processes as are used to manufacture plate glass.

The basic glasses included in the present invention contain $SiO_2$ from about 55 to about 75% by weight; $Na_2O$ 5 to 15%; $K_2O$ 0 to 10%, wherein the total alkali is not less than 11% nor more than 21%; $Al_2O_3$ 2 to 12%; CaO 0 to 10%; PbO 0 to 5%; and $Sb_2O_5$ or $As_2O_5$ or combinations thereof 0 to 2%; $F_2$ 1 to 6%; NiO 0.2 to 1%; CuO 0.5 to 5% and CoO 0 to 0.05% by weight.

Silica is the principal glass former. We prefer a range of $SiO_2$ of between 55 and 75% by weight of the glass composition. The durability of glass containing less than 55% $SiO_2$ is poor and such glass is likely to stain when exposed to weather. Furthermore, it is difficult to melt a glass composition including over 75% $SiO_2$. There is also a tendency for glass containing more than the desired maximum of $SiO_2$ to devitrify.

The alkali metal oxides, $Na_2O$ and $K_2O$ are the principal fluxes. $Li_2O$ may also be used to replace part or all of the $Na_2O$ and $K_2O$. However, the use of this material increases the cost of the batch and therefore we prefer to have between 11 and 21% by weight of a combination of $Na_2O$ and $K_2O$. Glass having less than 11% of $Na_2O$ and $K_2O$ is difficult to melt. Glass has poor durability when the total alkali metal oxide content exceeds 21% by weight. Further, an excessive amount of alkali metal oxide may adversely affect opacification of the glass.

The $Al_2O_3$ is desired to increase the length of the working range of the glass. If more than 12% $Al_2O_3$ is included in the glass, an excessive amount of alkali and fluorine is required to compensate for the excess stiffness imparted to the glass by the alumina. Glasses having less than 2% $Al_2O_3$ by weight are characterized by an undesirable working range.

In our glasses, fluorine serves both as an opacifying agent and as a flux. As an opacifying agent, it produces fluoride crystals which form in the glassy matrix. The opacity of the glass depends on the size and number of such crystals and is also a function of annealing. The careful control of opacification thus is most important to our glasses since it actually affects the structure of the material. It is apparent that the use of too much fluorine in these glasses will cause the formation of a glass unfavorably rich in fluoride crystals. This condition introduces whiteness sufficient to alter the color of the glass from the desirable uniform blue gray. Also, excessive opacity can alter the color of the glass by causing it to absorb minute quantities of polishing agents during surfacing operations.

By contrast, when our glasses are deficient in fluorine, the color is less uniform and has too much depth while the glass reflects too little of the incident light, and may even transmit some light. In its role as a flux, fluorine helps greatly to melt and homogenize the various batch materials since it not only decreases the viscosity of the glass at high temperatures, but also assists in freeing the molten batch of bubbles because a certain amount of the fluorine is evolved as a gas. Obviously, the use of at least 1% by weight of fluorine is a requisite to the making of our glasses. Likewise, for the reasons set forth above, not more than 6% by weight of fluorine should be employed. In actual practice, we prefer to have between 2.0% and 3.0% by weight of fluorine in our glasses, although as stated, up to 6% by weight or as low as 1% by weight may be used depending on the percentages of the other constituents, the manner the glass is cooled during annealing and the intensity of the color required.

Up to 10% by weight of CaO may be employed. CaO tends to produce a more uniform opacity in the glass because it promotes the formation of smaller fluoride crystals than are produced in CaO-free glass. However, CaO-containing glasses require more fluorine than CaO-free glasses, if a given level of opacity is to be maintained. Glass having above 10% CaO cannot be made of satisfactory opacity unless an extremely high percentage of fluorine is used and this results in a glass of poor durability. We prefer a glass which contains approximately 4 to 6% by weight of CaO in order to maintain a proper balance between the alkali and the fluorine content for optimum glass durability and in order to provide a means of regulating the opacity of the glass. Other bivalent metal oxides such as PbO, MgO, ZnO and BaO may also be substituted for part or all of the CaO and when such substitutions are made, the maximum total weight of the bivalent metal oxides may be increased to about 12% by weight. In general, we have found that the increased cost of these other materials does not justify their use.

The use of lead oxide is an exception, because the presence of PbO in the glass composition enhances the uniformity of distribution of the colorants throughout the volume of the glass being formed. Failure to include lead oxide may result in a variation in color in the finished glass product and, specifically, may cause the formation of a transparent layer adjacent to the surfaces of the glass when it is formed as a sheet. Hence, the use of lead oxide is justified despite its relative high cost compared to lime.

Arsenic and antimony are used as refining agents to aid in removing undissolved gases from the molten glass. More than 2% of either refining agent does not appear to be beneficial to the finished glass composition, but we prefer not to exclude them entirely from the glass because streaky, non-uniformly colored glass is the result of such exclusion.

The amount of fluorine present in the glass composition must be delicately balanced with the amount of nickel, copper and cobalt present. The balance between the fluorine and the coloring agents is necessitated by the manner in which the glass is made. Raw batch materials are thoroughly mixed before being fused together to form molten glass. After melting, the glass is refined to remove occluded gases. The refined glass is withdrawn from the furnace, formed into a sheet, and introduced into an annealing lehr where it is cooled. During this cooling operation, the glass is annealed, the fluoride crystals are formed, and the color develops as a result of using a combination of the proper proportions of fluorine and the other colorants.

A description of the method of making a Carrara glass such as the glass of the present invention is given in U.S. Patent No. 2,776,900 granted to James E. Duncan and Samuel L. Seymour and assigned to Pittsburgh Plate Glass Company. A more detailed description of the commercial method of making Carrara glass as employed by the Pittsburgh Plate Glass Company is set forth in the Glass Manual published by Pittsburgh Plate Glass Company and copyrighted in 1946. The base composition of Carrara glasses, together with numerous colorants which may be added thereto, is set forth on page 5, Section B-2 of the Glass Manual, and on page 4 of Section B-2. The method of making Carrara glass is referred to as the pot melting process which is employed for making plate glass. Manufacture begins with preparation and melting of the batch followed by the casting of the molten glass, annealing and the final step of grinding and polishing the rough product as it comes from the annealing lehr. The pot melting process is described in detail on pages 24 to 30, Section B-1, of the Glass Manual.

A Carrara glass becomes milky while it is being annealed due to the action of fluorine which has an opalizing, opacifying effect according to column 1, page 5, Section B-2 of the Glass Manual. This annealing is the same as is employed in the commercial manufacture of plate glass, whether made by the pot melting or tank melting method. The temperature of annealing is set forth in detail on page 12, Section B-1, of the Glass Manual and page 30, Section B-1 gives the speeds through the lehr. The glass is at a temperature of about 1500° F. entering the lehr and cools rapidly to about 1150° F., then very slowly to 950° F. and then rapidly again to room temperature. The temperature range from 1150° F. to 950° F. is known as the annealing range. It is during this conventional annealing that the glass opacifies and receives its final color. The glass proceeds through the lehr at a rate of about 108 inches per minute during the annealing.

The desired steel gray color which is produced, results from the mixture of the colors imparted to the glass by the nickel, copper, and cobalt colorants utilized and the white color produced upon crystallization of the fluorine-containing compounds. Therefore, it is necessary to have sufficient colorants to provide a uniform coloring and sufficient fluorine to provide uniform opalescence, throughout the volume of the composition.

The desired neutral or steel gray color is imparted to the glass by a combination of NiO and CuO, to which small quantities of CoO may be added. The relative proportion by weight of the copper oxide and nickel oxide preferably ranges between about 1:1 and 10:1 in order to provide the desired coloring to the glass composition. In any event, the total amount of nickel plus copper computed as the respective oxides is preferred to be between about 1% and 6% by weight of the glass composition. Some CoO, not exceeding .05% by weight of the composition, may be included in order to impart a slightly stronger bluish tint to the blue-gray color produced by the colorants. The total percentage of nickel computed as NiO, copper as CuO, and cobalt as CoO is required to be of the same order of magnitude as the percentage of fluorine contained in the opacified gray glass produced. The total weight percentage of the coloring ingredients should not be more than about 50% by weight above or below the weight percentage of fluorine in order to insure that the proper degree of uniformity of color is obtained and the color has the requisite opacity.

The following batch compositions listed in Table I were used in the preparation of suitable decorative opaque glasses having a homogeneous gray color, the calculated compositions of which are listed in Table II.

*Table I*

| Ingredient | Parts by weight | | | | | | |
|---|---|---|---|---|---|---|---|
| | Batch #1 | Batch #2 | Batch #3 | Batch #4 | Batch #5 | Batch #6 | Batch #7 |
| Sand | 958 | 958 | 958 | 958 | 958 | 958 | 958 |
| Soda Ash | 336 | 326 | 326 | 326 | 336 | 340 | 336 |
| Feldspar | 900 | 900 | 900 | 900 | 900 | 900 | 900 |
| Fluorspar (CaF$_2$) | 155 | 165 | 165 | 165 | 155 | 151 | 155 |
| Sodium Nitrate | 50 | 50 | 50 | 50 | 50 | 50 | 50 |
| Litharge (PbO) | 60 | 60 | 60 | 60 | 60 | 60 | 60 |
| Antimony Oxide (Sb$_2$O$_3$) | 10 | 15 | 15 | 15 | 15 | 15 | 15 |
| Nickel Oxide (green) | 11.5 | 9.6 | 18 | 14.4 | 9.6 | 9.6 | 9.6 |
| Copper oxide | 46 | 57.6 | 24 | 38.4 | 57.6 | 57.6 | 57.6 |
| Cobalt oxide | 0.06 | 0 | 0 | 0 | 0 | 0 | .19 |

Each of the above batches was thoroughly mixed and melted. The resulting glass compositions were opaque, had a gray color lying between x-coordinates 0.25 and 0.28 and y-coordinates 0.26 and 0.29 on an I.C.I. chromaticity chart based on illuminant "C" as described in "The Handbook of Colorimetry," by Arthur C. Hardy, published in 1936 by The Technology Press, M.I.T., and had the following calculated compositions. (The calculated percentage of fluorine is based on the assumption of a loss of 20% of the fluorine by volatilization during the formation of the glass composition from the raw batch ingredients.)

Table II

| Ingredient | Parts by Weight | | | | | | |
|---|---|---|---|---|---|---|---|
| | Comp. #1 | Comp. #2 | Comp. #3 | Comp. #4 | Comp. #5 | Comp. #6 | Comp. #7 |
| $SiO_2$ ---percent-- | 66.34 | 65.76 | 66.47 | 66.16 | 65.90 | 65.96 | 65.89 |
| $Na_2O$ ---do---- | 10.27 | 9.92 | 10.03 | 9.98 | 10.18 | 10.29 | 10.18 |
| $K_2O$ ---do---- | 4.16 | 4.12 | 4.16 | 4.16 | 4.13 | 4.13 | 4.13 |
| $Al_2O_3$ ---do---- | 6.79 | 6.73 | 6.80 | 6.77 | 6.74 | 6.75 | 6.74 |
| CaO ---do---- | 4.58 | 4.90 | 4.95 | 4.93 | 6.74 | 4.50 | 4.62 |
| $F_2$ ---do---- | 2.48 | 2.62 | 2.65 | 2.64 | 2.47 | 2.41 | 2.47 |
| PbO ---do---- | 2.54 | 2.52 | 2.55 | 2.53 | 2.53 | 2.53 | 2.53 |
| $Sb_2O_5$ ---do---- | .42 | .63 | .64 | .63 | .63 | .63 | .63 |
| NiO ---do---- | .47 | .39 | .74 | .59 | .39 | .39 | .39 |
| CuO ---do---- | 1.94 | 2.41 | 1.01 | 1.61 | 2.41 | 2.41 | 2.41 |
| CoO ---do---- | .003 | | | | | | .008 |
| Luminous reflectance based on illuminant "C" | 1.4 | 2.3 | 1.2 | 1.7 | 1.8 | 1.8 | 1.8 |
| Trichromatic coefficients: | | | | | | | |
| $x$ | 0.2520 | .2618 | .273 | .273 | .258 | .253 | .255 |
| $y$ | 0.2669 | .2893 | .281 | .285 | .274 | .276 | .272 |
| $z$ | 0.4811 | .4489 | .446 | .442 | .468 | .471 | .473 |
| Excitation purity | 26.8 | 19.5 | 17.5 | 17.0 | 23.5 | 25.0 | 25.0 |
| Dominant wavelength, $mm\mu$ | 280 | 484 | 478 | 480 | 480.5 | 482 | 480.5 |

The following table of reflectance characteristics of composition number 2 relative to MgO at various wavelengths within the visible spectrum is included for additional information concerning the optical characteristics obtained in a particular glass. It is desired that the percent reflectance be kept under 10% throughout the visible spectrum for any glass produced according to our invention.

| Wavelength (millimicrons): | Percent Reflectance |
|---|---|
| 400 | 8.9 |
| 420 | 4.6 |
| 440 | 3.0 |
| 460 | 2.6 |
| 480 | 2.7 |
| 500 | 2.7 |
| 520 | 2.7 |
| 540 | 2.6 |
| 560 | 2.3 |
| 580 | 2.1 |
| 600 | 1.8 |
| 620 | 1.4 |
| 640 | 1.2 |
| 660 | 1.2 |
| 680 | 1.2 |
| 700 | 1.1 |
| 720 | 1.1 |
| 740 | 1.0 |
| 750 | 1.0 |

It is understood that various modifications of ingredients within the ranges may be made without departing from the spirit of the present invention. It is understood that slight modifications in the amounts of various batch ingredients are required to form glass compositions within the desired range, depending upon the exact shade of gray and other characteristics desired. It is also understood that susbtitutions may be made in the various materials recited for the batch to provide the desired ingredients, but that the batch materials listed are the least expensive sources of these ingredients.

What is claimed is:

1. A glass having a calculated composition consisting essentially of $SiO_2$ 66.34% by weight, $Na_2O$ 10.27% by weight, $K_2O$ 4.16% by weight, $Al_2O_3$ 6.79% by weight, CaO 4.58% by weight, $F_2$ 2.48% by weight, PbO 2.54% by weight, $Sb_2O_5$ .42% by weight, NiO .47% by weight, CuO 1.94% by weight and CoO .003% by weight.

2. A glass having a calculated composition consisting essentially of $SiO_2$ 65.76% by weight, $Na_2O$ 9.92% by weight, $K_2O$ 4.12% by weight, $Al_2O_3$ 6.73% by weight, CaO 4.90% by weight, $F_2$ 2.62% by weight, PbO 2.52% by weight, $Sb_2O_5$ .63% by weight, NiO .39% by weight, and CuO 2.41% by weight.

3. A glass consisting essentially of 55 to 75% by weight $SiO_2$, 11 to 21% by weight of alkali metal oxides selected from the group consisting of 5 to 15% by weight $Na_2O$, 0 to 10% by weight $K_2O$ and 0 to 15% by weight $Li_2O$, 0 to 12% by weight of bivalent metal oxides selected from the group consisting of 0 to 10% by weight CaO, 0 to 5% by weight PbO, 0 to 12% by weight ZnO, 0 to 12% by weight BaO, and 0 to 12% by weight MgO, 2 to 12% by weight $Al_2O_3$, 1 to 6% by weight $F_2$, 0.2 to 1.0% by weight NiO, 0.5 to 5.0% by weight CuO and 0 to 0.05% by weight CoO, the total combined weight of NiO, CuO and CoO being not more than 50% by weight above or below the weight percentage of fluorine.

4. A glass such as recited in claim 3 wherein the CaO content is between 4% and 6% by weight, the PbO is between 2% and 3% by weight and $F_2$ is between 2% and 3% by weight.

5. A glass such as recited in claim 3 wherein the total combined weight of CuO, NiO and CoO ranges from about 1 to 6% by weight.

6. A glass such as recited in claim 3 wherein the trichromatic reflectance coefficients are within the following limits:

$x$—between 0.25 and 0.28
$y$—between 0.26 and 0.29

7. A glass such as recited in claim 3 wherein the amount of CuO is between about 1 and 10 times the amount of NiO by weight.

8. A glass consisting essentially of 55 to 75% by weight $SiO_2$, 11 to 21% by weight of alkali metal oxides selected from the group consisting of 5 to 15% by weight $Na_2O$, 0 to 10% by weight $K_2O$ and 0 to 15% by weight $Li_2O$, 0 to 12% by weight of bivalent metal oxides selected from the group consisting of 0 to 10% by weight CaO, 0 to 5% by weight PbO, 0 to 12% by weight ZnO, 0 to 12% by weight BaO, and 0 to 12% by weight MgO, 2 to 12% by weight $Al_2O_3$, 0 to 2% by weight of refining agents, 1 to 6% by weight $F_2$, 0.2 to 1.0% by weight NiO, 0.5 to 5.0% by weight CuO and 0 to 0.05% by weight CoO, the total combined weight of NiO, CuO and CoO being not more than 50% by weight above or below the weight percentage of fluorine.

9. A glass consisting essentially of 55 to 75% by weight $SiO_2$, 11 to 21% by weight of alkali metal oxides selected from the group consisting of 5 to 15% by weight $Na_2O$, 0 to 10% by weight $K_2O$ and 0 to 15% by weight $Li_2O$, up to 12% by weight of bivalent metal oxides selected from the group consisting of 0 to 10% by weight CaO, 0 to 5% by weight PbO, 0 to 12% by weight ZnO, 0 to 12% by weight BaO, and 0 to 12% by weight MgO, 2 to 12% by weight $Al_2O_3$, 1 to 6% by weight $F_2$, 0.2 to 1.0% by weight NiO, 0.5 to 5.0% by weight CuO and 0 to 0.05% by weight CoO, the total combined weight of NiO, CuO and CoO being not more than 50% by weight above or below the weight percentage of fluorine.

10. A glass consisting essentially of 55 to 75% by weight $SiO_2$, 11 to 21% by weight of alkali metal oxides selected from the group consisting of 5 to 15% by weight $Na_2O$, 0 to 10% by weight $K_2O$ and 0 to 15% by weight $Li_2O$, up to 12% by weight of bivalent metal oxides selected from the group consisting of 0 to 10% by weight CaO, 0 to 5% by weight PbO, 0 to 12% by weight ZnO, 0 to 12% by weight BaO, and 0 to 12% by weight MgO, 2 to 12% by weight $Al_2O_3$, 0 to 2% by weight of refining agents, 1 to 6% by weight $F_2$, 0.2 to 1.0% by weight NiO, 0.5 to 5.0% by weight CuO and 0 to 0.05% by weight CoO, the total combined weight of NiO, CuO and CoO being not more than 50% by weight above or below the weight percentage of fluorine.

11. A glass consisting essentially of the following ingredients in percent by weight: 55 to 75% $SiO_2$, 5 to 15% $Na_2O$, 0 to 10% $K_2O$, the sum total of alkali metal oxides being 11 to 21%, 2 to 12% $Al_2O_3$, 0 to 10% CaO, 0 to 5% PbO, 1 to 6% $F_2$, 0.2 to 1.0% NiO, 0.5 to 5.0% CuO, and 0 to 0.05% CoO, the total combined weight of NiO, CuO and CoO being not more than 50% by weight above or below the weight percentage of fluorine.

12. A glass consisting essentially of the following ingredients in percent by weight: 55 to 75% $SiO_2$, 5 to 15% $Na_2O$, 0 to 10% $K_2O$, the sum total of alkali metal oxides being 11 to 21%, 2 to 12% $Al_2O_3$, 0 to 10% CaO, 0 to 5% PbO, 0 to 2% $Sb_2O_5$, 1 to 6% $F_2$, 0.2 to 1.0% NiO, 0.5 to 5.0% CuO, and 0 to 0.05% CoO, the total combined weight of NiO, CuO and CoO being not more than 50% by weight above or below the weight percentage of fluorine.

References Cited in the file of this patent

FOREIGN PATENTS 430,387    Great Britain ------------------ 1935